May 25, 1965 A. C. CURTISS 3,185,055
PHOTOGRAPHIC ILLUMINATION APPARATUS
Filed May 21, 1962 2 Sheets-Sheet 2

INVENTOR.
Alan C. Curtiss
BY Brown and Mikulka
ATTORNEYS

United States Patent Office 3,185,055
Patented May 25, 1965

3,185,055
PHOTOGRAPHIC ILLUMINATION APPARATUS
Alan C. Curtiss, Cambridge, Mass., assignor to Polaroid Corporation, Cambridge, Mass., a corporation of Delaware
Filed May 21, 1962, Ser. No. 196,370
6 Claims. (Cl. 95—11)

This invention relates to photography and more particularly to photographic illumination.

Photographic cameras have been proposed wherein a small flash unit is permanently secured to a portion of the camera, such as the shutter housing, for example. In such cameras, the built-in unit is normally adapted to utilize a particular bulb or type of bulb which will provide proper flash illumination for a particular speed or sensitivity of photographic film intended for use in the camera. If it is desired to use such a camera for taking artificially illuminated pictures with films of widely differing sensitivities, it is necessary to provide some additional or auxiliary lighting means for giving proper flash illumination for such film sensitivities.

Accordingly, it is a principal object of the present invention to provide a novel auxiliary photographic lighting unit for use in conjunction with cameras having a permanent, built-in flash system.

Another object is to provide an auxiliary flash unit for detachable mounting on a photographic camera, wherein the unit has electrical contacts adapted for insertion in the bulb receptacle of an existing flash system permanently mounted on a portion of the camera.

A further object is to provide a detachable flash unit for use in conjunction with a photographic camera having a socket for receiving the electrical contacts of the detachable unit, the socket being pivotally mounted for rotational movement with respect to the axis of the contacts, wherein means are provided for rotating the socket to a proper position to receive the contacts when the auxiliary unit is mounted on the camera.

Still another object is the provision of novel photographic lighting apparatus which is simple in operation, economical in manufacture, durable and reliable in use, and refined in appearance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
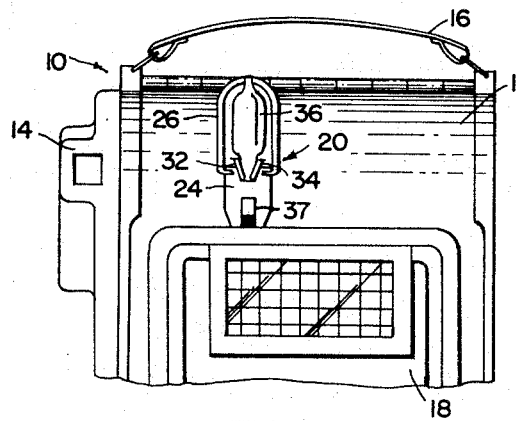
FIGURES 1 and 2 are fragmentary views of the front of a photographic camera having a permanent built-in flash unit adapted to be contained within a portion of the shutter housing, showing the flash unit in two different positions of adjustment.

In the copending U.S. application of Edwin H. Land et al., Serial No. 102,047, filed April 10, 1961, is disclosed a camera apparatus having a permanently mounted flash unit adapted to provide artificial illumination for a scene to be photographed by film of a particular sensitivity. Although such a camera may be adapted for employment with films of various sensitivities, the artificial illumination provided by the built-in flash gun may not provide adequate illumination for films of speeds other than that with which the flash gun was designed to operate. For example, there are three general types of vaporizable-filament type flash bulbs which are in wide commercial use. These are: the "miniature" type, characterized by the AG-1 bulb manufactured by General Electric Company and Sylvania Electric Products, Inc., for example, the "M-type" or medium size bulb, characterized by the M-3, M-5 and M-25 bulbs, some or all of which are currently manufactured by the Westinghouse Corp. in addition to the manufacturers of the AG-1; and the large or "Press-type" bulbs such as the Press-5 and Press-25, also manufactured by the above firms. For purposes of simplicity and brevity the above-listed types of flash bulbs will be referred to as small, medium and large size, respectively. Although the burning characteristics of bulbs within a given type may be different so that the scene illumination will be properly synchronized with the opening of the camera shutter, the light output of all or most bulbs of a given type is substantially the same. That is, the small bulbs are designed to provide a relatively small amount of illumination, the medium bulbs a higher amount, and the large bulbs a still higher amount. The amount of illumination required, and therefore the bulb to be used, to provide proper scene illumination depends upon the characteristics of the exposure control system and the "speed" or sensitivity of the film. With a given camera, a small bulb may provide sufficient illumination when a "fast" film is used, but a medium or large bulb may be required when using slower films in the same camera.

In addition to varying in the level or amount of light output, the different sizes or types of bulbs in normal commercial availability are provided with bases of different size or configuration. A different socket or bulb receptacle is therefore required to accommodate different types of bulbs. Although a few flash guns having sockets for accepting more than one type of bulb are available, the ordinary, inexpensive flash gun is adapted to utilize only one of the three types of bulbs. Hence, if a camera is provided with a permanently mounted flash gun which is of the usual type capable of utilizing only one type of bulb, for example, a small bulb, adequate lighting may not be provided when "slower" films are used in the camera. It therefore becomes desirable to provide auxiliary illuminating means which may be selectively mounted for use in conjunction with such cameras and which is better suited to provide proper illumination when using film of speeds different than that with which the built-in flash gun was designed to operate.

The conventional method of mounting a detachable flash apparatus upon a photographic camera is to provide a jack or plug on the camera which provides electrical contact between the flash gun and the flash synchronizing circuit of the camera, as well as aiding in supporting the flash gun upon the camera. Rather than providing a separate jack or plug for the auxiliary flash apparatus, the present invention contemplates a device which allows the bulb receptacle of the built-in flash gun to serve as the means for providing electrical contact between the auxiliary flash gun and the camera flash circuit.

Figure 2:
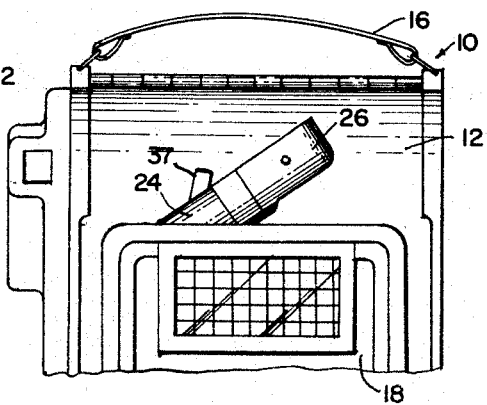

Referring now to the drawings, in FIGURE 1 is seen a portion of a conventional photographic camera 10 having the usual camera body 12, range and view finder 14, strap or handle 16, and lens and shutter housing 18. As previously mentioned, the camera illustrated is shown and described in greater detail in copending application Serial No. 102,047. Mounted upon shutter housing 18 for selective movement between a plurality of positions is flash unit 20 comprising base portion 22, bulb socket 24, and reflector 26. A recess 28 is provided in a portion of shutter housing 18. Base portion 22 is pivotally mounted upon rod 30 within recess 28 for pivotal movement about an axis which in this case is substantially parallel with the optical axis of the camera 10. Bulb socket 24 is rotatably mounted upon base portion 22 so that bulb socket 24 and reflector 26 may be rotated with respect to base portion 22, for example, between the positions illustrated in FIGURES 1 and 2.

Figure 3:
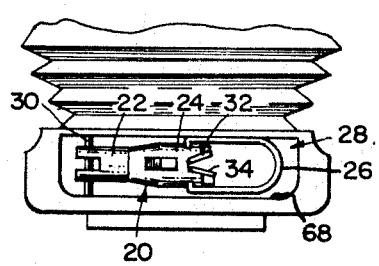
FIG. 3 is a fragmentary top plan view of a portion of the camera of FIGURES 1 and 2 showing the flash gun in the retracted position within the shutter housing.

Flash unit 20 is shown in FIG. 3 fully retracted within recess 28. Bulb socket 24 is provided with a pair of electrical contacts 32 and 34 which are resiliently biased toward one another and adapted to receive therebetween the base of a conventional flash bulb 36. A conventional ejecting device having a manually engageable portion 37 is provided to aid in removing expended bulbs from socket 24. Since the entire unit is designed to be retracted within a portion of the shutter housing, the reflector and bulb are of necessity relatively small. However, in spite of its small size, the reflector is adequate for use with a film of relatively high sensitivity. For example, an AG-1 bulb, which flash unit 20 is adapted to utilize, will provide proper illumination under normal conditions for a film having an ASA speed rating of approximately 3,000. Use of a compact reflector also tends to eliminate the so-called "hot spot" of light which is frequently found to be incident upon the photographic subject through the use of more conventional reflectors.

Figure 7:
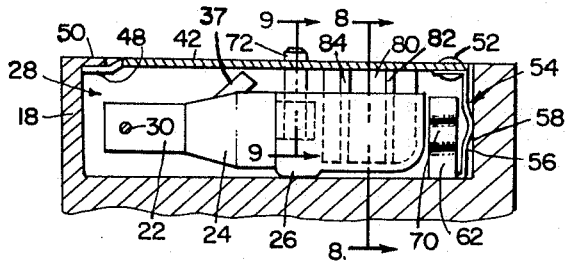
FIG. 7 is a front view of the interior of the shutter housing in vertical section on the line 7—7 of FIG. 4.
Figure 8:
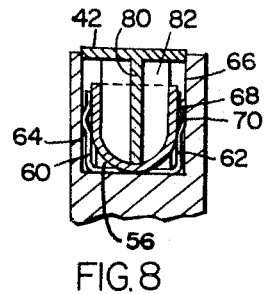
FIG. 8 is a side view in section on the line 8—8 of FIG. 7.

The auxiliary lighting device of the present invention is adapted to be installed on camera 10 when flash unit 20 is retracted within recess 28 as shown in FIG. 3. The auxiliary flash unit 35 comprises a conventional conoidal reflector 36 having a base portion 38 mounted upon a forwardly extending portion 40 of adapter plate 42. It is possible, of course, to mount flash unit 35 directly on adapter plate 42 without the use of forwardly extending portion 40. However, in the camera shown, shutter housing 18 is adapted for movement to a retracted position at least partially within camera body 12. With flash unit 35 mounted forwardly of the shutter housing, as upon portion 40, the camera may be folded in the usual manner without removing the auxiliary flash apparatus. A socket 44 is provided interiorly of reflector 36 and is adapted to receive a bulb 46 preferably of significantly larger light output than bulb 36. For example, if socket 24 is adapted to receive a miniature or small bulb, socket 44 may be adapted to receive medium and/or large bulbs. As best seen in FIG. 7, adapter plate 42 is retained upon camera 10 in covering relation to recess 28 of shutter housing 18 by means of an end portion 48 which is inserted under an edge, or lip 50 which extends inwardly over a portion of recess 28. At the opposite end of adapter plate 42, secured thereto by suitable means such as rivets 52, is a spring member 54. Spring member 54 may be formed from a single sheet of suitable material, such as any resiliently deformable metal, which is formed, as illustrated, to engage three interior sides of recess 28. End portion 56 of spring member 54 engages end wall 58 of recess 28, as best seen in FIG. 7; side portions 60 and 62 of spring member 54 engage side walls 64 and 66, respectively, of recess 28, as best seen in FIG. 8. Since in the particular camera illustrated side wall 66 contains a screw 68 in that portion at which it is engaged by side spring portion 62, it is advantageous to provide a depression or ridge 70 in side spring portion 62 which will engage screw 68 and retain the end of adapter plate 42 more securely within recess 28. At any rate, since spring member 54 includes portions which engage the interior of recess 28 on three sides, adapter plate 42 is retained firmly in position without movement or play in any direction.

Figure 6:
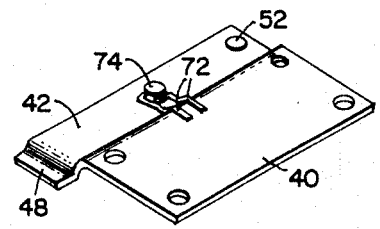
FIG. 6 is a perspective view of certain elements of the apparatus of FIG. 4.
Figure 4:
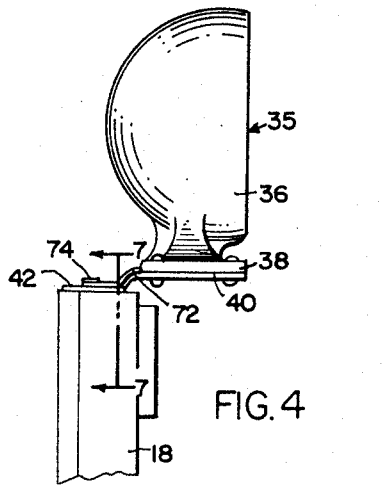
FIG. 4 is a side elevational view of a detachable flash assembly shown mounted upon the camera of FIGURES 1 and 2.
Figure 5:
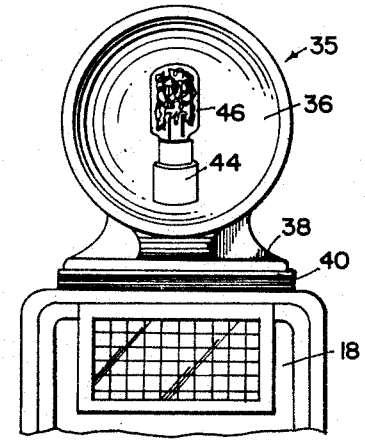
FIG. 5 is a front view of the apparatus of FIG. 4.
Figure 9:
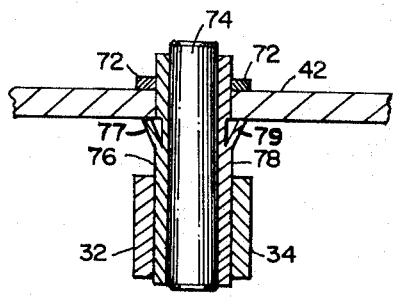
FIG. 9 is an enlarged side view in section on the line 9—9 of FIG. 7.

The bulb contacts (not shown) of socket 44 are provided with electrical leads 72 (FIG. 6) which extend along the upper side of adapter plate 42 to pin 74 which is made of a suitable rigid, electrically-insulating material. As best seen in FIG. 9, electrical contacts 76 and 78 are a part of or connected to leads 72 and extend with pin 74 through adapter plate 42. When adapter plate 42 is installed on shutter housing 18, pin 74 and electrical contacts 76 and 78 are adapted to be inserted between electrical contacts 32 and 34 in bulb socket 24 of flash unit 20. Electrical contact is thus provided between the camera flash circuit and auxiliary flash unit 35. In order to expedite assembly of flash unit 35, contacts 76 and 78 may be provided with spring portions 77 and 79, respectively. As indicated in FIG. 9, portions of contacts 76 and 78 are partially cut and bent out from the top. After contacts 76 and 78 are attached one on either side of pin 74 the pin and contacts may be inserted through the hole provided for this purpose in adapter plate 42. As pin 74 and contacts 76 and 78 pass through adapter plate 42 from top to bottom as seen in FIG. 9 spring portions 77 and 79 are compressed. As soon as the spring portions have passed completely through the hole they snap out to engage the lower side of adapter plate 42 as shown in FIG. 9. Pin 74 cannot be withdrawn through the hole in adapter plate 42 until spring portions 77 and 79 have been manually depressed. Insertion of pin 74 and contacts 76 and 78 in socket 24 therefore cannot cause them to move upwardly through adapter plate 42.

As previously mentioned, reflector 26 and bulb socket 24 are rotatably mounted upon base portion 22. It is therefore possible that these elements of flash unit 20 will not be disposed in exactly vertical position as they should be for proper insertion of pin 74 between electrical contacts 32 and 34. On the bottom of adapter plate 42 is a longitudinal rib 80 and a pair of transverse ribs 82 and 84. The outer peripheries of these ribs are shaped to conform substantially to the internal dimensions of reflector 26. Also, when adapter plate 42 is put in position on shutter housing 18, the ribs 80, 82 and 84 are so dimensioned that their peripheries are incontact with the interior of reflector 26, as seen in FIGS. 7 and 8. Therefore, since ribs 80, 82 and 84 are permanently aligned with respect to adapter plate 42 and pin 74, reflector 26 will be automatically rotated by contact therewith of ribs 80, 82 and 84 to a properly aligned position for insertion of pin 74 between electrical contacts 32 and 34. The ribs also aid in holding reflector 26 and socket 24 in such position while auxiliary flash unit 35 is mounted.

Figure 10:
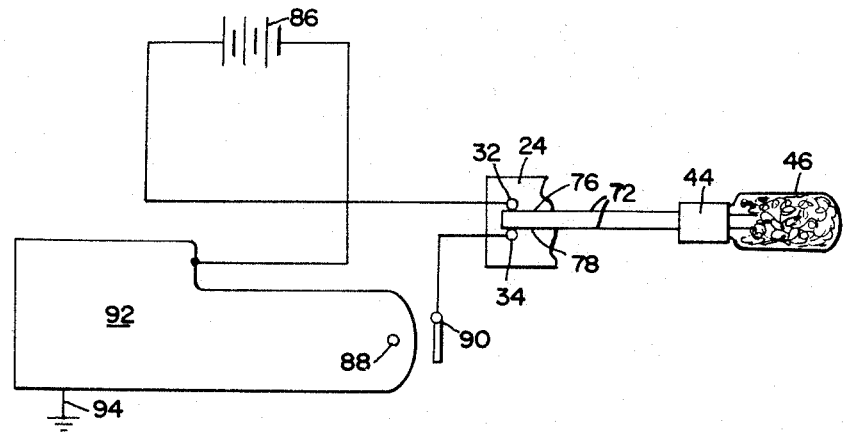
FIG. 10 is a schematic wiring diagram of a suitable circuit for the operation of the flash apparatus.

A schematic wiring diagram showing a suitable electrical circuit for operation of the above described apparatus is shown in FIG. 10. It will be readily understood, however, that many suitable wiring arrangements previously known in the art may be satisfactorily used in conjunction with the apparatus of the invention. Battery 86 has one terminal connected with electrical contact 32 of bulb socket 24 and the other terminal in suitable electrical connection with one of the contacts identified with the camera shutter mechanism (not shown). Electrical contacts 88 and 90 represent the shutter flash contacts and numeral 92 denotes the mounting plate for this mechanism, which is connected to ground as indicated at 94. Contacts 76 and 78 are inserted in bulb socket 24 and electrically connected to contacts 32 and 34. Leads 72 provide electrical communication from contacts 76 and 78 to the bulb contacts of socket 44 in which bulb 46 is installed. Thus, as the camera shutter is operated, contacts 88 and 90 are closed, allowing electrical energy from battery 86 to be applied to bulb 46, causing the bulb to "fire." If auxiliary unit 35 is not mounted on the camera, but instead a bulb is installed in flash unit 20 then, of course, that bulb will be fired in the same manner.

It is therefore apparent that the present invention provides unique, simple and compact means for adapting a camera provided with permanently mounted flash apparatus with an auxiliary flash unit for utilizing bulbs differing in light output from those which the built-in unit is adapted to utilize. Proper flash illumination may thus be provided for a large variety of film speeds in a camera having a flash gun which is permanently mounted and adapted to utilize only a single type of flash bulb. The auxiliary unit is provided with means for receiving its electrical supply directly through the bulb terminals of the built-in unit, thus eliminating the necessity of providing a separate plug or jack on the camera for mounting the auxiliary unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In combination with a photographic camera arrangement:
   (a) a first flashgun including a first reflector and a first bulb receptacle;
   (b) attaching means for fixedly mounting said first flashgun on a portion of said camera;
   (c) a second flashgun including a second reflector and a second bulb receptacle;
   (d) a flash synchronizing circuit electrically connected to said first bulb receptacle;
   (e) electrical contact means extending rigidly from an anchored position on said second flashgun and electrically connected to said second bulb receptacle;
   (f) means for detachably mounting said second flashgun on said camera; and
   ((g) positioning means for so fixing the relative positions of said first and second flashguns when the latter is mounted on said camera that said electrical contact means extend into said first bulb receptacle, making electrical contact therewith, thus including said second bulb receptacle in said flash synchronizing circuit.

2. In combination with a photographic camera arrangement:
   (a) a first flashgun permanently mounted upon said camera and including a first reflector and a first bulb receptacle;
   (b) means for mounting said first reflector for movement with respect to said camera;
   (c) a second flashgun including a base member having a second reflector and a second bulb receptacle mounted thereon;
   (d) a flash synchronizing circuit electrically connected to said first bulb receptacle;
   (e) electrical contact means extending rigidly from an anchored position on said base member and electrically connected to said second bulb receptacle;
   (f) mounting means on said second flashgun for engagement with a portion of said camera, whereby said second flashgun may be detachably mounted thereupon;
   (g) positioning means for fixing the relative positions of said camera and said second flashgun when the latter is mounted; and
   (h) engagement means on said base member arranged to contact a portion of said first flashgun as said second flashgun is mounted on said camera and to position said first flashgun in a first position of its movement wherein said electrical contact means extend into said first bulb receptacle, making electrical contact therewith, thus including said second bulb receptacle in said flash synchronizing circuit.

3. A photoflash system for use in conjunction with a photographic camera having a flash synchronizing circuit, said system comprising, in combination:
   (a) an electrical power source in said circuit;
   (b) a flash flash unit permanently mounted upon a portion of said camera and including a first reflector and a first bulb receptacle operatively connected in said circuit;
   (c) a second flash unit including a second reflector and a second bulb receptacle;
   (d) means for detachably mounting said second flash unit on said camera;
   (e) positioning means for fixing the relative position of said camera and said second flash unit when the latter is mounted;
   (f) electrical contacts operatively connected to said second receptacle and extending rigidly from said second flash unit for insertion in said first receptacle as said second flash unit is mounted on said camera, thereby connecting said second receptacle into said circuit;
   (g) said first flash unit being rotatably mounted and positioned to receive said electrical contacts only when in a first position of its rotational movement; and
   (h) engagement means on said second flash unit constructed and arranged to contact a portion of said first flash unit and to move said first flash unit to said first position in response to movement of said second flash unit as the latter is mounted on said camera.

4. The invention according to claim 3 wherein said engagement means comprises a fixed portion extending from said second flash unit having an external periphery of substantially the same curvature as the internal surface of said first reflector and so arranged relative to the positions of said first and second flash units when the latter is mounted on said camera as to be in contact with said internal surface.

5. An auxiliary photographic lighting unit for use with a camera having a flash synchronizing circuit and a built-in lighting unit with a reflector and bulb receptacle movable to a retracted position within a recess provided therefor in said camera, said auxiliary unit comprising, in combination:
   (a) a substantially flat base portion;
   (b) a reflector and bulb receptacle mounted on the upper side of said base portion;
   (c) electrical contact means extending rigidly from the lower side of said base portion and electrically connected to the bulb receptacle of said auxiliary unit;
   (d) mounting means on said base portion for engagement with a portion of said camera, whereby said auxiliary unit may be detachably mounted on said camera in covering relation to said recess with said electrical contact means extending into said recess; and (e) positioning means for so fixing the relative positions of said auxiliary and said built-in units with respect to said camera that said electrical contact means are inserted in the bulb receptacle of said built-in unit when said auxiliary unit is mounted on said camera.

6. The invention according to claim 5 and further including engagement means associated with said lower side of said base portion and arranged to contact a portion of said built-in unit as said auxiliary unit is mounted on said camera to properly position the bulb receptacle of said built-in unit to receive said electrical contact means.

References Cited by the Examiner
UNITED STATES PATENTS

| | | | |
|---|---|---|---|
| 2,682,603 | 6/54 | Dine | 240—1.3 |
| 2,776,364 | 1/57 | Daniels | 240—1.3 |
| 2,967,469 | 1/61 | Lachaize | 95—11 |
| 2,976,398 | 3/61 | McKee | 240—1.3 |

NORTON ANSHER, *Primary Examiner.*
JOHN M. HORAN, *Examiner.*